US006994541B2

(12) United States Patent
Chung et al.

(10) Patent No.: US 6,994,541 B2
(45) Date of Patent: Feb. 7, 2006

(54) UNIFORM PRESSING APPARATUS

(75) Inventors: Yong-Chen Chung, Hsinchu (TW); Chia-Hung Lin, Hsinchu (TW); Chia-Chun Hsu, Hsinchu (TW); Chuan-Feng Chen, Hsinchu (TW); Wen-Hung Feng, Hsinchu (TW); Ming-Chi Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 140 days.

(21) Appl. No.: 10/663,830

(22) Filed: Sep. 17, 2003

(65) Prior Publication Data

US 2004/0219249 A1 Nov. 4, 2004

(30) Foreign Application Priority Data

May 2, 2003 (TW) .............................. 92208080 U

(51) Int. Cl.
*B29C 59/02* (2006.01)

(52) U.S. Cl. .................. 425/385; 425/389; 425/405.1; 425/408; 425/DIG. 19

(58) Field of Classification Search ................ 425/385, 425/389, 405.1, 406, 408, 415, DIG. 14, 425/DIG. 19
See application file for complete search history.

(56) References Cited

U.S. PATENT DOCUMENTS

| | | | | |
|---|---|---|---|---|
| 5,558,015 A * | 9/1996 | Miyashita et al. | ....... | 425/405.1 |
| 5,993,189 A | 11/1999 | Mueller et al. | | |
| 6,062,133 A * | 5/2000 | Blalock | ...................... | 100/211 |
| 6,482,742 B1 | 11/2002 | Chou | | |

FOREIGN PATENT DOCUMENTS

| | | |
|---|---|---|
| WO | WO 01/42858 | 6/2001 |

* cited by examiner

*Primary Examiner*—Duane Smith
*Assistant Examiner*—Thu Khanh T. Nguyen
(74) *Attorney, Agent, or Firm*—Rabin & Berdo, P.C.

(57) ABSTRACT

A uniform pressing apparatus used in nanoimprint lithographic process is proposed, including a housing having a first flange; a first carrier unit for carrying an imprint mold and having at least one second flange freely attaches to the first flange; a second carrier unit for carrying a substrate; at least one uniform pressing unit mounted on a imprint force transmission path; and a power source driving at least one of the housing and the second carrier unit to allow a contact to be formed between the mold and the moldable layer. Therefore, the nanoimprint lithographic process is achieved with good parallelism between the substrate and the mold and with uniform pressure distribution.

9 Claims, 9 Drawing Sheets

UNIFORM PRESSING APPARATUS

FIELD OF THE INVENTION

The invention relates to a uniform pressing apparatus, and more particularly, to a uniform pressing apparatus which achieves good parallelism between a mold and a substrate via free contact of the mold and the substrate in nanoimprint lithography.

BACKGROUND OF THE INVENTION

In a conventional semiconductor process, a photolithographic process is usually used to form traces over a chip or a substrate. However, this process is technically limited in the processing of features having a line width smaller than 100 nanometers due to the light diffraction. Therefore, a nanoimprint lithographic (NIL) process is proposed to replace the photolithographic process for manufacturing devices with very high resolution, with a high throughput and a low manufacturing cost.

FIG. 6A through to FIG. 6C illustrate the operation of a nanoimprint lithographic including a cycle of heating, imprinting, and cooling. At the heat stage as shown in FIG. 6A, a moldable layer applied over a substrate 31 is heated to an operating temperature required for imprinting. In FIG. 6B, a mold 22 having nanoscale features 23 is mounted on an upper molding plate 20', and the mold 22 is driven by a power source 50 to move toward the substrate 31 mounted on a lower molding plate 30'. When the mold 22 comes into contact with a moldable layer 32 which is formed above the substrate 31, the mold 22 is pressed against the moldable layer 32 to make an engagement, so that the features on the mold 22 are transferred to the moldable layer 32. The moldable layer 32 is then cooled down to a proper temperature. In FIG. 6C, the moldable layer 32 is disengaged from the mold 22 to complete the nanoimprint lithographic process.

Since the nanoimprint process is carried out at the level of nanoscale, the imprinting process is certainly tighter in terms of quality control than the conventional hot embossing process. However, as can be understood from the operation process described previously, the mold 22 and the nanoscale features 23 may be deformed or distorted, resulting uneven imprint depths as shown in FIG. 7A if the pressure is not uniformly applied during the nanoimprint process. Referring to FIG. 7B, the mold 22 may not be parallel to the substrate 31, as the nanoscale features 23 are tilted above the area to be imprinted, causing deterioration in the imprint quality. The situations described above may cause damage to the nanoscale features 23 during the demolding stage. Therefore, molding quality and manufacture efficiency in mass production are both degraded due to non-uniform distribution of imprinting pressure and poor parallelism between the mold and the substrate. These problems often occurred as a result of poor designs or inferior processing/assembly of the imprint equipment, and apparently need to be resolved by improving the imprinting equipment FIG. 8 is a schematic view of a hot embossing apparatus disclosed in U.S. Pat. No. 5,993,189. An imprint mold 63 and a substrate 64 are respectively carried on an inner carrier 61 and an outer carrier 62, which carriers are in relative movement. A power source then drives the carriers 61, 62 to engage, so that the nanoscale features of the imprint mold 63 are pressed against the moldable layer which is formed above the substrate 64. As this apparatus is not provided with any parallelism adjustment, a desired parallelism is achieved solely via processing or assembly of its parts. And with such apparatus design, there are too many modifications in terms of processing and assembly of the parts, making it difficult to satisfy the nanoimprinting requirements, as well as to manufacture equipment of the same quality by mass production. Furthermore, since the conventional force transmission mechanism does not satisfy the requirement of uniform pressure distribution in the nanoimprint lithographic process, it is not easy to maintain imprint quality.

FIG. 9 illustrates a fluid pressure imprint lithography apparatus disclosed in U.S. Pat. No. 6,482,742. After a mold 72 and a substrate 73 coated with a moldable layer are sealed, they are placed in a closed chamber 74 and heated to a predetermined molding temperature. The chamber 74 is then filled with fluid to exert pressure on the mold 72, so as to perform nanoimprinting. According to this apparatus design, the mold 73 and substrate 73 are stacked and encapsulated into a seal before imprinting, and the seal has to be broken after the pattern is transferred to allow demolding. Accordingly, the stacking and sealing of the mold 72 and the substrate 73 increase both the processing costs and molding period, resulting in inefficient nanoimprinting. And since the mold 72 and substrate 73 need to be sealed before the imprinting, it is also difficult to perform alignment for the mold 72 and the substrate 73. As a result, the imprint quality and precision are degraded.

FIG. 10 illustrates a nanoscale imprint lithography apparatus disclosed in PCT Patent No WO 0142858. The apparatus is formed with a pressure chamber 82 that can be pressurized via an inlet channel 83. With pressure exerted by fluid, a mold 81 is pushed toward or away from a substrate 85 as a result of deformation of a flexible membrane 84, so as to complete nanoimprinting or demolding. But if the mold 81 is not placed at center of the flexible membrane 84, the flexible membrane 84 may expand asymmetrically when the inlet channel 83 is filled with fluid, thereby causing the mold 81 to misalign from the substrate 85.

Therefore, the above-mentioned problems associated with the prior arts are resolved by providing a uniform pressing apparatus applicable to nanoimprinting to improve the nanoimprint quality, while the apparatus has benefits in terms of excellent parallelism, simple structure, low cost, simple operation procedures, and fast molding.

SUMMARY OF THE INVENTION

The primary objective of the present invention is to provide a uniform pressing apparatus applicable to a nanoimprint lithographic process and provides good parallelism between a substrate and a mold.

Another objective of the present invention is to provide a uniform pressing apparatus in which the mold and the substrate are in free contact.

A further objective of the present invention is to provide a uniform pressing apparatus that has a simple structure and can be manufactured at low cost.

Yet another objective of the present invention is to provide a uniform pressing apparatus that is easily operated without preliminary preparation.

In accordance with the above and other objectives, the present invention proposes a uniform pressing apparatus applicable to the nanoimprint lithographic process. The uniform pressing apparatus includes a housing, a first carrier unit, a second carrier unit, at least a uniform pressing unit, and a power source. The housing has at least an opening and the housing is formed with a first flange extending in a first direction from periphery of the opening. The first carrier unit carries an imprint mold. The first carrier unit further has at least a second flange extending in a second direction opposite the first direction, so that the second flange is temporarily attached on the first flange to permit movement of the housing along with the first carrier unit. The second carrier unit carries a substrate on which a moldable layer is formed, such that the moldable layer is opposite to the imprint mold. The uniform pressing unit includes a closed flexible membrane and fluid that fills the closed flexible membrane, and is mounted on a path for transmitting force required for imprinting. The power source drives at least one of the housing and the second carrier unit to allow the mold to make a contact with the moldable layer. And by such contact, the first flange is detached from the second flange, so that the uniform pressing apparatus is subjected to pressure and as to achieve good nanoimprinting with uniform pressing.

The power source further includes a feeding power source and an imprint power source. The feeding power source drives at least one of the housing and the second carrier unit to allow the mold to make a contact to the moldable layer. After the second flange is detached from the first flange, the imprint power source drives to put pressure on the uniform pressing unit so as to complete the nanoimprinting with uniform pressing. Alternatively, the second carrier unit can carry the mold and the first carrier unit can carry the substrate to achieve the same effect.

The uniform pressing unit includes a closed flexible membrane and fluid that fills the closed flexible membrane. The uniform pressing unit is mounted on an imprint force transmission path alongside the first carrier unit or the second carrier unit, such that the uniform pressing unit is located between the housing and the first carrier unit if the uniform pressing unit is mounted alongside the first carrier unit. And the uniform pressing unit is located between the housing and the second carrier unit if the uniform pressing unit is mounted alongside the second carrier unit.

Therefore, the uniform pressing unit of the present invention uses the first and second flanges to keep the mold and the substrate in free contact via temporary attachment of the flanges, and to achieve optimal parallelism between the mold and substrate during the contact. Then, the nanoscale features of the mold are pressed against the moldable layer by the force required for imprinting transmitted from the uniform pressing unit, so as to uniformly imprint the features in the moldable layer. Since the area to be imprinted is subjected to a uniform pressure, optimal parallelism can be maintained during imprint process to improve quality of nanoimprinting. Thereby, the problems such as non-uniform imprinting pressure, poor parallelism, structure complexity, long imprint period associated with the prior art can be overcome.

To provide a further understanding of the invention, the following detailed description illustrates embodiments and examples of the invention, it is to be understood that this detailed description is being provided only for illustration of the invention and not as limiting the scope of this invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
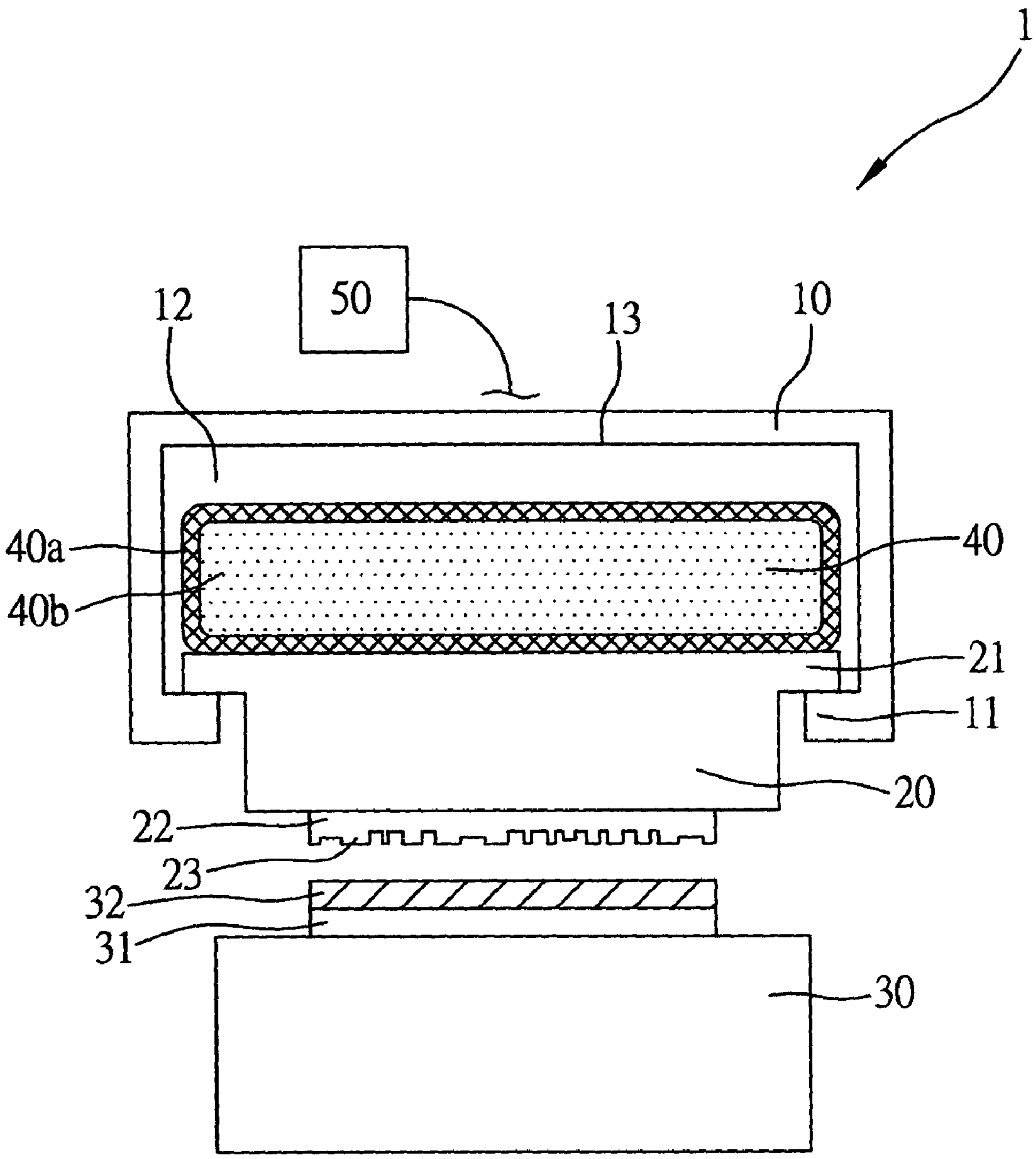
FIG. 1 is a schematic view of a uniform pressing apparatus according to a first embodiment of the invention.

Wherever possible in the following description, like reference numerals will refer to like elements and parts unless otherwise illustrated.

Referring to FIG. 1, a uniform pressing apparatus 1 applicable to the nanoimprinting process includes a housing 10, a first carrier unit 20, a second carrier unit 30, an uniform pressing unit 40 and a power source 50. The housing 10 has an opening to be defined as an accommodating space 12. At least a first flange 11 is formed extending inwards from periphery of the opening. The first carrier unit 20 is mounted on the housing 10 by attaching at least a second flange 21 extended outwards from the first carrier unit 20 to the first flange 11 temporarily, so as to form a contact between the first flange 11 and the second flange 21. Accordingly, the second flange 21 is kept inside the accommodating space 12, preventing the first carrier unit 20 from falling out of the housing 10. And the first carrier unit 20 can freely move with respect to the housing 10 as the housing 10 is driven by the power source 50 to move along with the first carrier unit 20 via the contact formed between the first and second flanges 11, 21.

An imprint mold 22 is carried on a surface of the first carrier unit 20 opposite to the second flange 21. A nanoscale feature 23 to be imprinted is formed on the mold 22. A substrate 31 is mounted on a surface of the second carrier unit 30 opposite the mold 22. A moldable layer 32 is formed by coating, for example, polymer, over the substrate 31, such that the moldable layer 32 faces the mold 22 to facilitate the imprinting of the nanoscale feature 23. Furthermore, the uniform pressing unit 40 is mounted on the first carrier unit 20 that is received inside the accommodating space 12, as illustrated in FIG. 1. That is, the uniform pressing unit 40 is disposed on the first carrier unit 20 on an imprint force transmission path alongside the first carrier unit. The uniform pressing unit 40 includes a closed outer membrane 40_a_ made of a flexible material, and fluid 40_b_ that fills the membrane 40_a_. The fluid 40_b_ inside of the sealing membrane 40_a_ has an isobaric property and therefore provides uniform force transmission and uniform pressing as well as a good parallelism between the mold 22 and the substrate 31. The power source 50 is mounted on one side of the housing 10, so that the housing 10 is driven to move toward the second carrier unit 30. Since the first flange 11 is attached to the second flange 21, the movement of the housing 10 causes the first carrier unit 20 as well as the mold 22 to move until a contact is made with the substrate 31 on the second carrier unit 30 to perform nanoimprinting. The power source 50 may also provide a force required for imprinting during the imprinting process.

The design of the first flange 11 and the second flange 21 according to the apparatus of the present invention is not limited to that shown in FIG. 1. Any other designs that achieve the same effect as described above and allow formation of free contact by attachment of flanges may be also adopted in the invention. The present invention is not limited to forming flat surface contact between the first flange 11 and the second flange 21, both having flat surfaces thereon, as described in this embodiment. For example, the first and second flanges 11, 21 can be formed with corresponding slanted surfaces, tapered surfaces or spherical surface to prevent the first and second flanges 11, 21 from freely moving along a horizontal direction.

In FIG. 1, the uniform pressing unit 40 is mounted between the first carrier unit 20 and the housing 10. And the uniform pressing unit 40 is located inside the accommodating space 12. However, the location of the uniform pressing unit 40 is not limited to a specific position alongside the first carrier unit 20. The uniform pressing unit 40 also may be disposed along the imprint force transmission path alongside the second carrier unit 30. For example, when the uniform pressing unit 40 is mounted between the second carrier unit 30 and the substrate 31, the imprinting may be carried out via forming a contact between the substrate 31 and the mold 22. Accordingly, with designs of the flexible membrane 40*a* and the fluid 40*b*, the uniform pressing unit 40 is subjected to the pressure, which in turn provide uniform pressing for the imprinting process.

Depending on the practical needs, the power source 50 may be located at different locations and provide different functions, as described in details in the next four embodiments, with reference to the flanges 11, 21, and the uniform pressing unit 40 illustrated in FIG. 1.

Figure 2A:
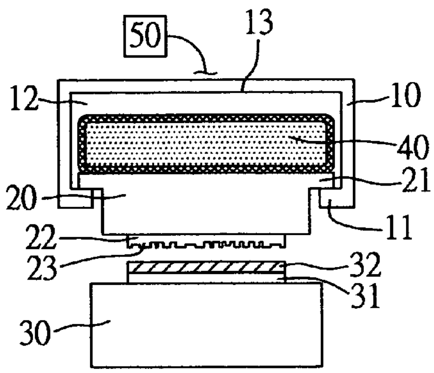
FIG. 2A through to FIG. 2D are schematic views illustrating the operation of a uniform pressing apparatus of FIG. 1.
Figure 2B:
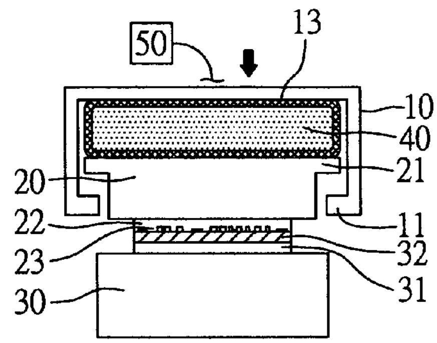
Figure 2C:
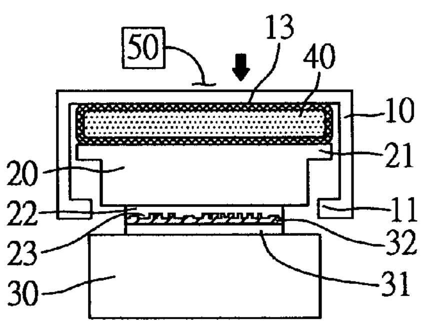
Figure 2D:
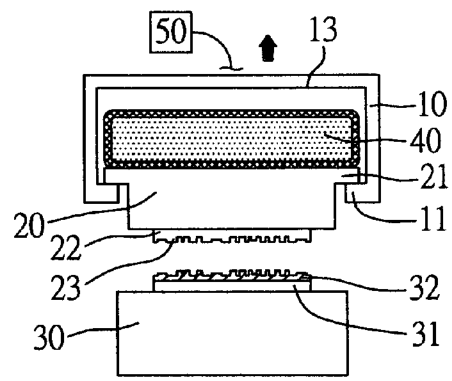

FIG. 2A through to FIG. 2D illustrate the operation of a uniform pressing apparatus according to a first embodiment of the invention. Referring to FIG. 2A, a substrate 31 is subjected to a horizontal alignment with a mold 22. Referring to FIG. 2B, the power source 50 drives the housing 10, along with the first carrier unit 20 and the mold 22 to move toward the substrate 31 on the second carrier unit 30. Thereby, the nanoscale feature 23 on the mold 22 makes a contact with a moldable layer 32. Since the first flange 11 makes free contact with the second flange 21, the mold 22 and the substrate 31 are not restrained to each other when the mold 22 makes the contact with the substrate 31. Therefore, an optimal parallelism is achieved at the moment when the contact is made. As shown in FIG. 2B, the second flange 21 is detached from the first flange 11 as a result of a counteracting force that acts on the second flange 21 to push the second flange 21 away from the first flange 11. The housing 10 is still driven by the power source 50 to move downward. Referring to FIG. 2C, after the first flange 11 is detached from the second flange 21, the housing 10 keeps moving such that its closed end 13 makes the contact with the uniform pressing unit 40. At this time, the power source 50 keeps exerting force on the uniform pressing unit 40 until it is pressed to transmit the imprint force at a pre-determined level, so as to perform the imprinting action. Finally, after imprinting action is carried out, the power source 50 drives the housing 10 in an opposite direction, e.g. upwardly, to separate the closed end 13 from the uniform pressing unit 40, as shown in FIG. 2D. The first flange 11 is then driven to move upwards and push against the second flange 21, which moves upwardly along with the first carrier unit 20 to separate the mold 22 from the substrate 31 in the demolding step, so as to complete all of the imprinting process.

Figure 3A:
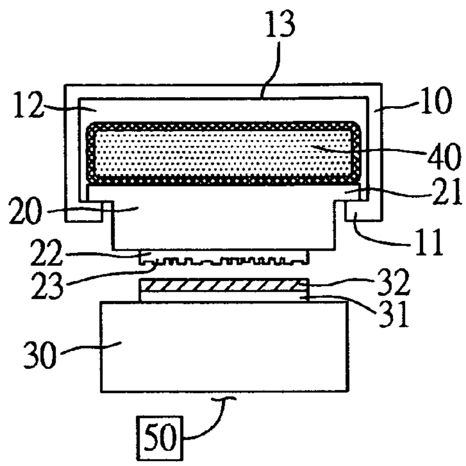
FIG. 3A through to FIG. 3D are schematic views illustrating the operation of a uniform pressing apparatus according to a second embodiment of the invention.
Figure 3B:
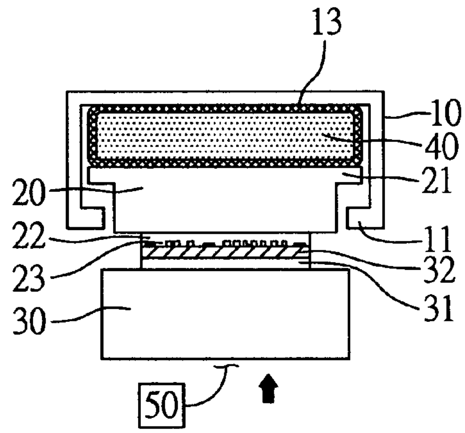
Figure 3C:
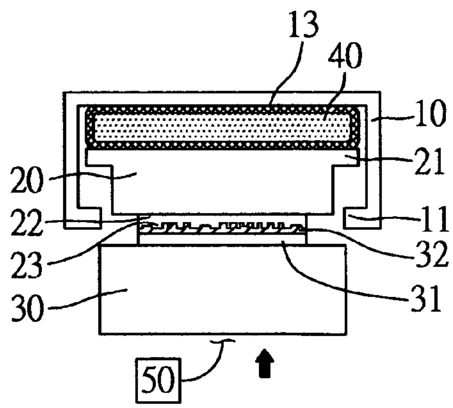
Figure 3D:
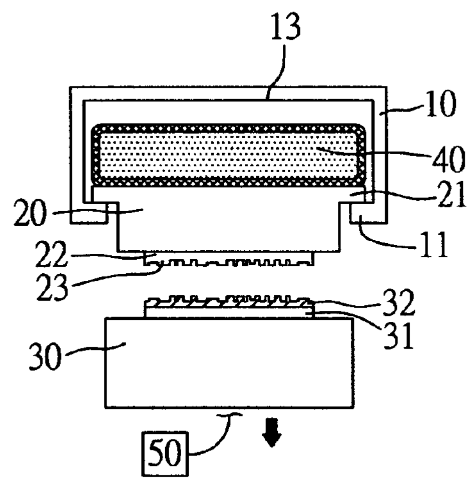

FIG. 3A through to FIG. 3D illustrate the operation of a uniform pressing apparatus according to a second embodiment of the invention. Similarly, the invention includes a housing 10, a first carrier unit 20, a uniform pressing unit 40, a second carrier unit 40 and a power source 50. The power source 50 is mounted alongside the second carrier unit 30 to drive movement of the second carrier unit 30 towards the first carrier unit 20. The power source 50 further provides an imprint force, so that the imprinting process is carried out via the contact formed as a result of the substrate moving towards the nanoscale features. The substrate 31 is subjected to a horizontal alignment with the mold 22 as shown in FIG. 3A. The power source 50 drives the second carrier unit 30 and the substrate 31 on the second carrier unit 30 to move toward the first carrier unit 20 and the mold 22 on the first carrier unit 20, as shown in FIG. 3B. The first flange 11 makes a free contact with the second flange 21 to achieve optimal parallelism between the substrate 31 and the mold 22 when the substrate 31 makes the contact with the mold 22. After the second flange 21 is detached from the first flange 11, the second carrier unit 30 is still driven to move until the uniform pressing unit 40 moves upward to make the contact with the closed end 13 of the housing 10. Referring to FIG. 3C, with continued pressure exertion from the power source 50, the uniform pressing unit 40 is pressed to transmit the imprint force at a pre-determined level, so as to perform the imprinting action. Finally, referring to FIG. 3D, the power source 50 drives the second carrier unit 30 in a reversed direction to separate the uniform pressing unit 40 from the closed end 13 of the housing 10. When the second flange 21 moves downward to make the contact with the first flange 11, the movement of the second flange 21 is stopped on the first flange 11. As a result, the mold 22 is separated from the substrate 31 in the demolding step. The imprint process is therefore accomplished.

Figure 4A:
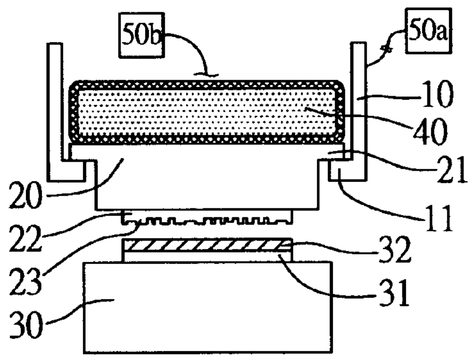
FIG. 4A through to FIG. 4D are schematic views illustrating the operation of a uniform pressing apparatus according to a third embodiment of the invention.
Figure 4B:
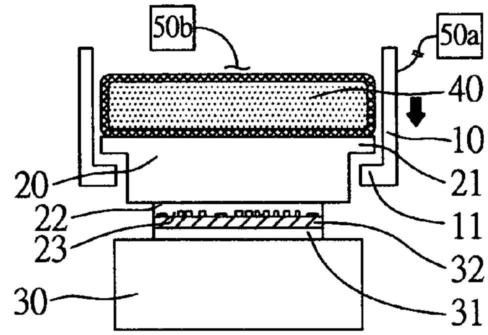
Figure 4C:
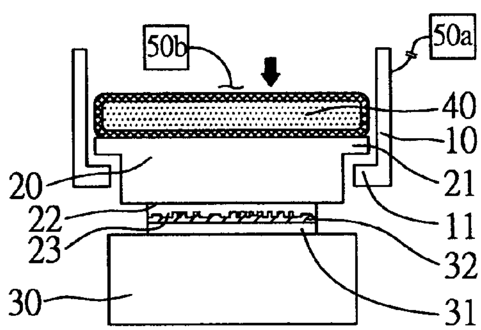
Figure 4D:
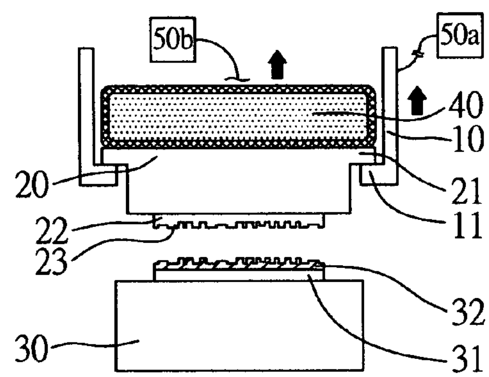

FIG. 4A through to FIG. 4D illustrate the operation of a uniform pressing apparatus according to a third embodiment of the invention. Similarly, the invention includes a housing 10, a first carrier unit 20, a second carrier unit 30, a uniform pressing unit 40, and a power source 50. In this embodiment of the invention, the power source 50 includes a feeding power source 50*a* and an imprint power source 50*b*. The feeding power source 50*a* drives the housing 10 to move toward the second carrier unit 30, while the imprint power source 50*b* drives the uniform pressing unit 40 to exert pressure. The substrate 31 and the mold 22 are subjected to a horizontal alignment as shown in FIG. 4A. The feeding power source 50*a* drives the housing 10 to move downward along with the first carrier unit 20 and the mold 22. The first flange 11 makes the free contact with the second flange 21 to achieve optimal parallelism between the substrate 31 and the mold 22 when the substrate 31 makes the contact with the mold 22. Referring to FIG. 4C, the housing 10 keeps moving downward to cause separation of the first flange 11 from the second flange 21. Thereafter, the imprint power source 50*b* exerts pressure on the uniform pressing unit 40, such that the uniform pressing unit is pressed to transmit the imprint force at a pre-determined level. Referring to FIG.

4D, the imprint power source 50$b$ and the feeding power force 50$a$ act in opposite direction in sequence until movement of the first flange 11 is stopped on the second flange 21, thereby the mold 22 is separated from the substrate 31 in the demolding step. The imprint process is therefore accomplished.

Figure 5A:
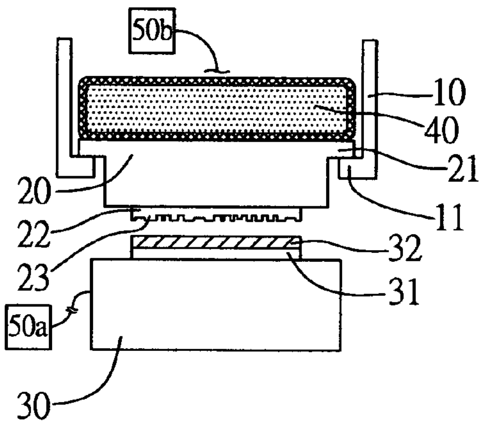
FIG. 5A through to FIG. 5D are schematic views illustrating the operation of a uniform pressing apparatus according to a fourth embodiment of the invention.
Figure 5B:
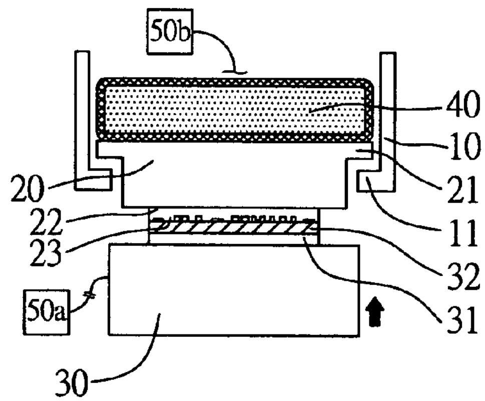
Figure 5C:
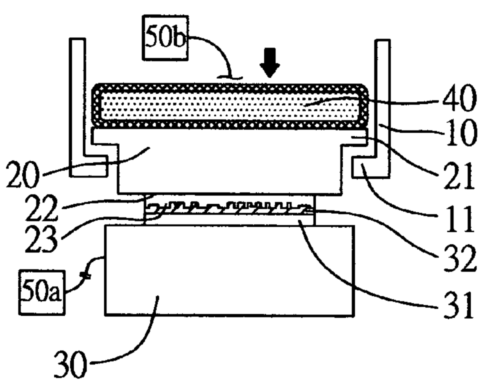
Figure 5D:
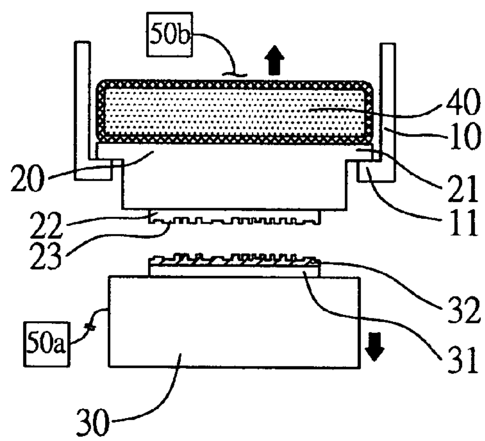
Figure 6A:
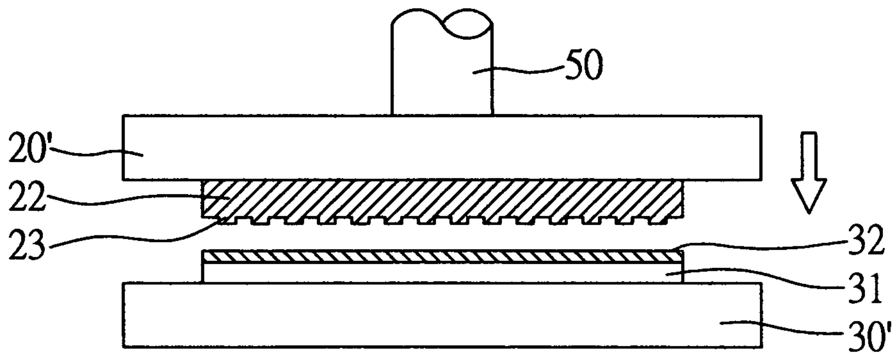
FIG. 6A through to FIG. 6C (PRIOR ART) are schematic views illustrating a nanoimprinting process including heating, imprinting, cooling and demolding.
Figure 6B:
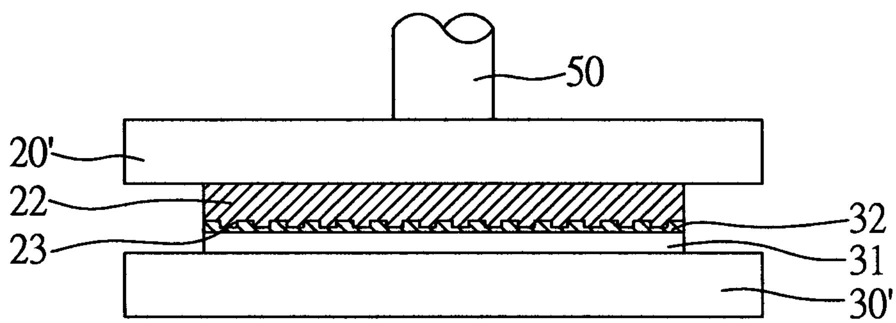
Figure 6C:
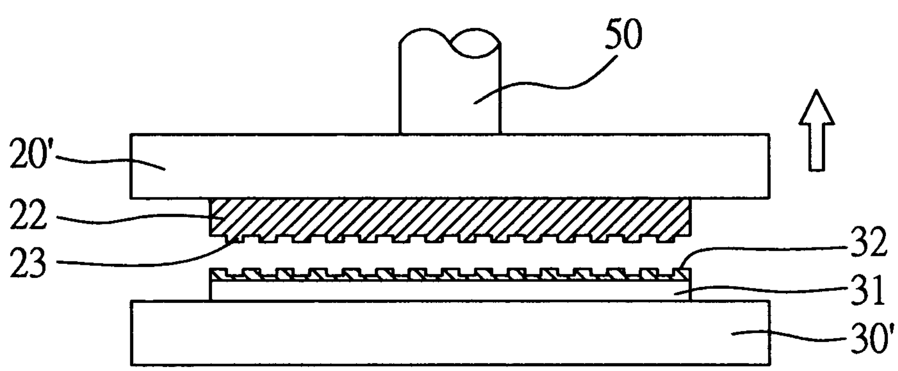
Figure 7A:
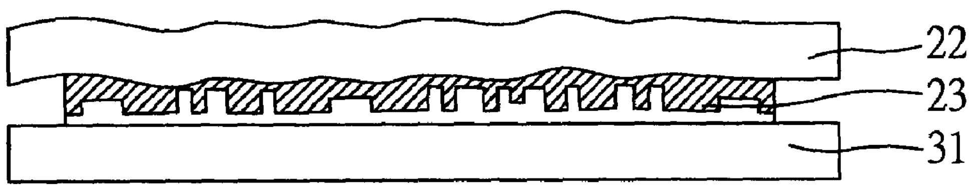
FIG. 7A through to FIG. 7B (PRIOR ART) are schematic views illustrating the defects of prior art in nanoimprinting process.
Figure 7B:
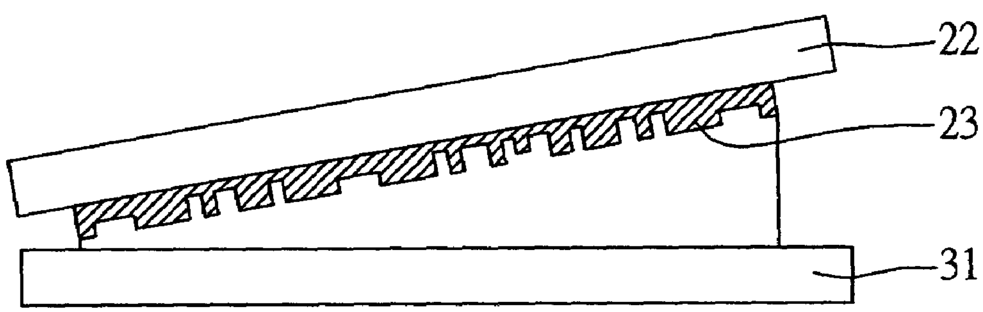
Figure 8:
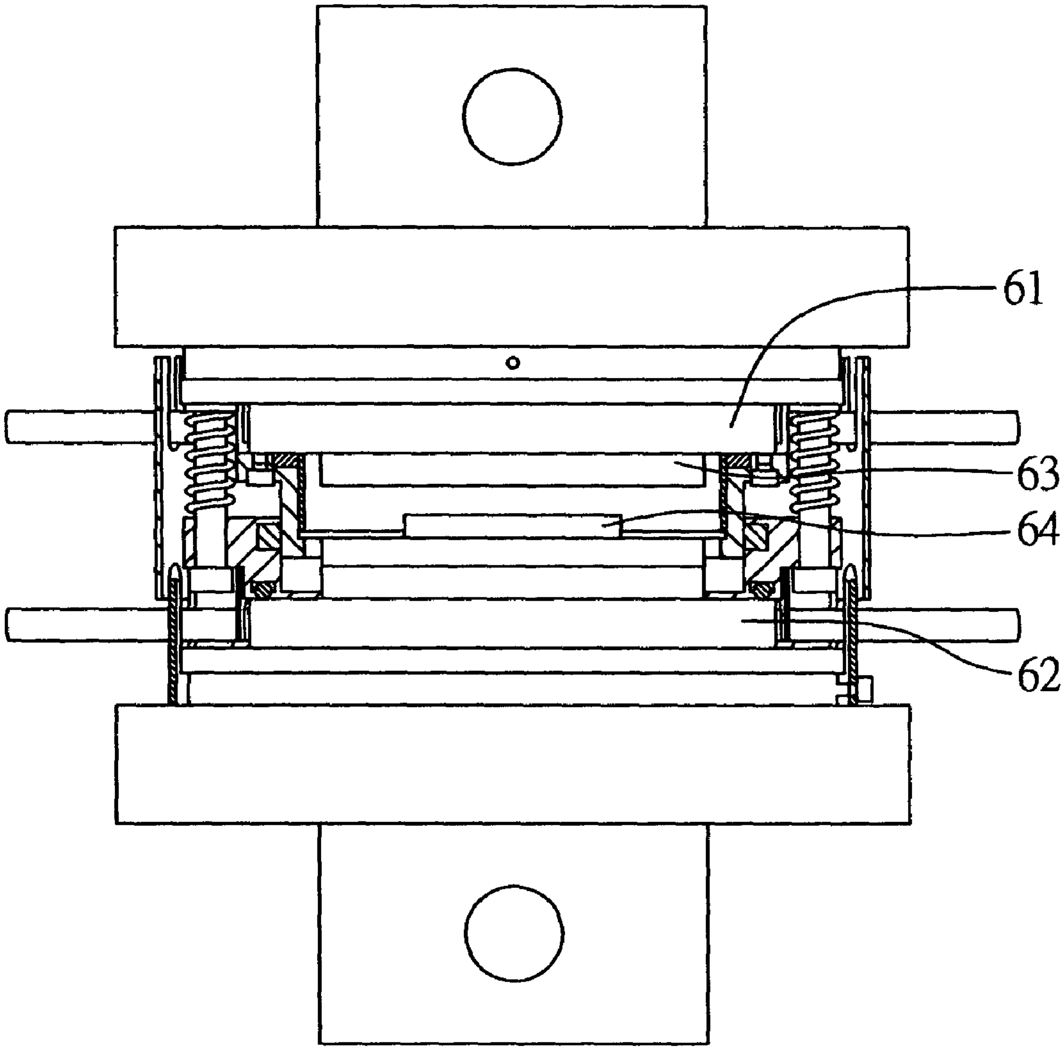
FIG. 8 (PRIOR ART) is a schematic view of a nanoimprinting apparatus disclosed in U.S. Pat. No. 5,93,189.
Figure 9:
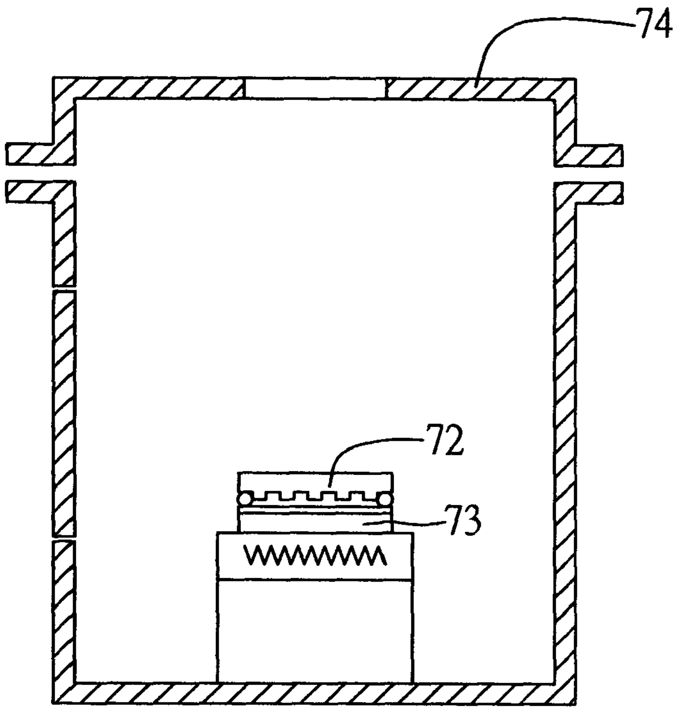
FIG. 9 (PRIOR ART) is a schematic view of a nanoimprinting apparatus disclosed in U.S. Pat. No. 6,482,742.
Figure 10:
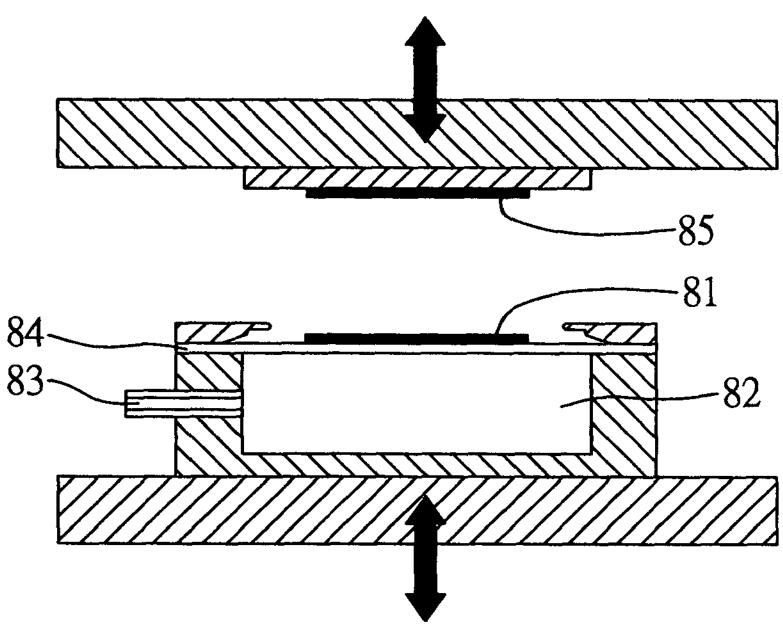
FIG. 10 (PRIOR ART) is a schematic view of a nanoimprinting apparatus disclosed in WO 01422858.

FIG. 5A through to FIG. 5D illustrate the operation of a uniform pressing apparatus according to the fourth embodiment of the invention. Similarly, the invention includes a housing 10, a first carrier unit 20, a second carrier unit 30, a uniform pressing unit 40, and a power source 50. In this embodiment of the invention, the power source 50 also includes the feeding power source 50$a$ and the imprint power source 50$b$. The feeding power source 50$a$ drives the second carrier unit 30 to move toward the first carrier unit 20. The imprint power source 50$b$ drives the uniform pressing unit 40 to exert pressure. The substrate 31 and the mold 22 are subjected to a horizontal alignment as shown in FIG. 5A. Referring to FIG. 5B, the feeding power source 50$a$ drives the second carrier unit 30 to move upward along with the substrate 31. The first flange 11 makes the free contact with the second flange 21 to achieve optimal parallelism between the substrate 31 and the mold 22 when the substrate 31 makes the contact with the mold 22. Referring to FIG. 5C, once the second flange 21 is separated from the first flange 11, the imprint power source 50$b$ exerts pressure on the uniform pressing unit 40 until the uniform pressing unit is pressed to transmit the imprint force at a pre-determined level. Referring to FIG. 5D, the imprint power source 50$b$ and the feeding power force 50$a$ act in opposite directions in sequence to drive movement of the second flange 21 downward until a contact is made with the first flange 11. Thereby, the mold 22 is separated from the substrate 31 as a result of stopping movement of the second flange 21 on the first flange 11 in the demolding step. The imprint process is therefore accomplished.

As described above, the free contact established between the mold 22 with the substrate 31 allows optimal parallelism to be achieved the moment the mold makes the contact with the substrate 31. Furthermore, with the pressure exerted by the uniform pressing unit 40, the mold 22 and the substrate 31 are pressed uniformly during a period to carry out the imprinting action, to thereby achieve uniform pressing and good parallelism.

In the uniform pressing apparatus 1 of the invention, the pressing process can be maintained in a pre-determined imprinting specification. This can be accomplished by mounting a pressure sensor (not shown) on the uniform pressing unit 40 to measure the applied pressure when the mold 22 makes the contact with the moldable layer 32, and thereby monitor the imprint process from the measured pressure. After the mold makes the contact with the moldable layer 32 and the pressure applied to both is brought up to a certain value, the applied pressure is maintained at the constant value according to a predetermined pressure—time operation curve for several seconds. The relationship between pressure and time can be experimentally obtained depending on the imprint material and precision required. The first carrier unit 20 or the second carrier unit 30 may also be mounted on an alignment platform (not shown) to establish the horizontal alignment. Furthermore, the feeding power source 50$a$ and the imprint power source 50$b$ may be a hydraulic driving system, a atmospheric driving system or a motor transmission system. The mold 22 and the substrate 31 are respectively mounted on the first carrier unit 20 and the second carrier unit 30 by means of vacuum suction force, mechanical force or electromagnetic force.

In the invention, the locations of the above components can be changed where necessary. For example, positions for the mold 22 and the substrate 31 are interchangeable. In this case, the first carrier unit 20 may carry the substrate 31 while the second carrier unit 30 may carry the mold 22. The process is then performed according to a similar manner to the above.

As described above, the uniform pressing apparatus applicable to the nanoimprint lithographic process provides optimal parallelism between the mold and the substrate, and improved pressure distribution. This solve the problems associated with the prior arts, such as poor parallelism and non-uniform distribution of pressure caused by processing and assembly errors, as well as vibration of the power source. Furthermore, the uniform pressing apparatus of the present invention has a simplified structure manufactured with low cost and can be easily operated.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A uniform pressing apparatus applicable to a nanoimprint lithographic process, comprising:

a housing having at least one opening and formed with a first flange extending in a first direction from a periphery of the opening;

a first carrier unit for carrying an imprint mold, the first carrier unit being formed with a second flange extending in a second direction opposite to the first direction, allowing the second flange to be movably attached to the first flange to form surface contact between the first flange and the second flange such that the first carrier unit moves along with movement of the housing;

a second carrier unit for carrying a substrate with a moldable layer formed thereon, wherein the moldable layer faces toward the imprint mold;

at least one uniform pressing unit comprising a closed flexible membrane and fluid filling the closed flexible membrane, the uniform pressing unit being mounted on a path to transmit force required for imprinting; and a driving unit for feeding and driving at least one of the housing and the second carrier unit, to allow the imprint mold to come into contact with the moldable layer, making the second flange separated from the first flange via the contact between the imprint mold and the moldable layer, and keeping the uniform pressing unit being pressed to perform the nanoimprint lithographic process.

2. The uniform pressing apparatus of claim 1, wherein the driving unit is a power source for feeding and imprinting.

3. The uniform pressing apparatus of claim 1, wherein the driving unit is a combination of a power source for feeding and a power source for imprinting.

4. The uniform pressing apparatus of claim 1, wherein the driving unit is one selected from the group consisting of a hydraulic driven system, atmospheric driven system, and motor transmission system.

5. The uniform pressing apparatus of claim 1, wherein the surface contact formed between the first flange and the second flange is one selected from the group consisting of free surface contact, slanted surface contact, taper surface contact, and spherical surface contact.

6. The uniform pressing apparatus of claim 1, wherein the uniform pressing unit is mounted on the path to transmit force required for imprinting for one of the first and second carrier units.

7. The uniform pressing apparatus of claim 1, wherein the imprint mold and the substrate are fixed on the first and second carrier units respectively by means of vacuum suction force, mechanical force, and electromagnetic force.

8. The uniform pressing apparatus of claim 1, wherein at least one of the first and second carrier units is mounted on an alignment platform to achieve alignment during imprinting.

9. The uniform pressing apparatus of claim 1, further comprising a sensor unit for sensing pressure and force during imprinting, so as to provide loop control for the pressure and force.

* * * * *